United States Patent [19]

Kersey

[11] Patent Number: 4,874,244
[45] Date of Patent: Oct. 17, 1989

[54] METHOD AND APPARATUS FOR INCREASING THE UNAMBIGUOUS SENSING RANGE IN AN INTERFEROMETRIC FIBER GYROSCOPE

[75] Inventor: Alan D. Kersey, Springfield, Va.

[73] Assignee: Sachs/Freeman Associates, Inc., Landover, Md.

[21] Appl. No.: 68,181

[22] Filed: Jun. 30, 1987

[51] Int. Cl.$^4$ ............................................. G01B 9/02
[52] U.S. Cl. ..................................... 356/350; 356/345
[58] Field of Search ................................ 356/350, 345

[56] References Cited

U.S. PATENT DOCUMENTS

| | | | |
|---|---|---|---|
| 4,408,882 | 10/1983 | Sheem | 356/350 |
| 4,444,503 | 4/1984 | Schiffner | 356/350 |
| 4,707,136 | 11/1987 | Kim | 356/350 |

OTHER PUBLICATIONS

Lewin et al., "Two Wide-Dynamic-Range Signal-Recovery Schemes for the Fiber-Optic Gyroscope," *IEE Proceedings*, vol. 132, Pt. J, No. 5, Oct. 1985, pp. 271-276.
Kersey et al., "Two-Wavelength Fiber Gyroscope with Wide Dynamic Range," *Electronics Letters*, vol. 22, No. 18, Aug. 28, 1986, pp. 935-937.
Kersey et al., "Two-Wavelength, Wide-Dynamic Range Fiber Gyroscope,"*SPIE Proceedings*, vol. 719, Fiber Optic Gyros 10th Anniversary Conference, Sep. 24-26, 1986, pp. 135-140.

*Primary Examiner*—Vincent P. McGraw
*Assistant Examiner*—S. A. Turner
*Attorney, Agent, or Firm*—Foley & Lardner, Schwartz, Jeffery, Schwaab, Mack, Blumenthal & Evans

[57] ABSTRACT

A method and apparatus, utilizing multiple light signals, for extending the dynamic range of an interferometric system such as an optical fiber gyroscope based on dual wavelength measurement of the Sagnac phase shift in order to determine the fringe number of the interferometric fiber system, thereby increasing the unambiguous range of the device. An analogue measure of the fringe number is provided, thus eliminating the need for digital fringe counting or tracking. An apparatus is described for measuring absolutely, within certain upper bounds determined by the exact wavelengths used, the rotation rate when the system is powered up in a rotating frame.

28 Claims, 9 Drawing Sheets

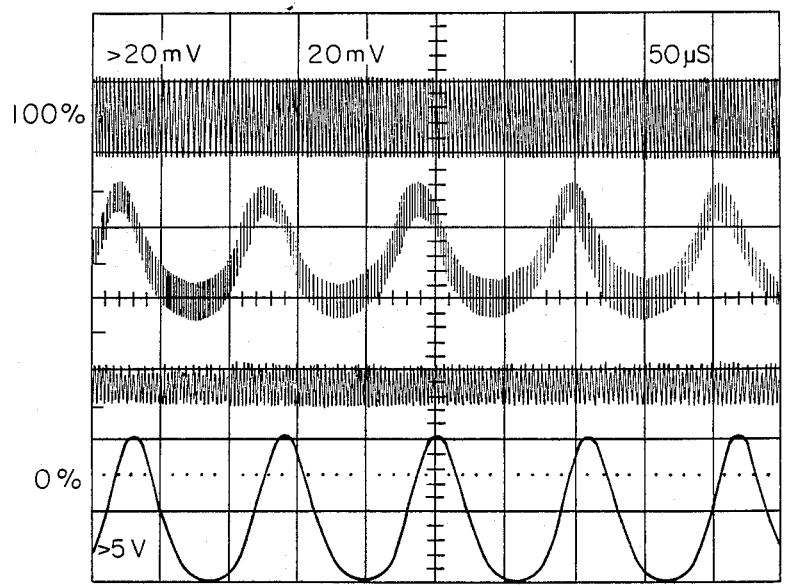
FIG. 5
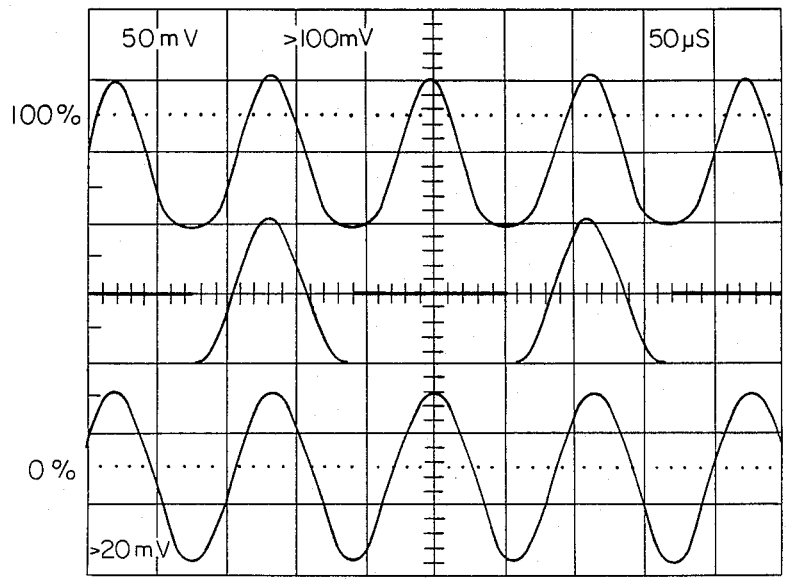

(a)
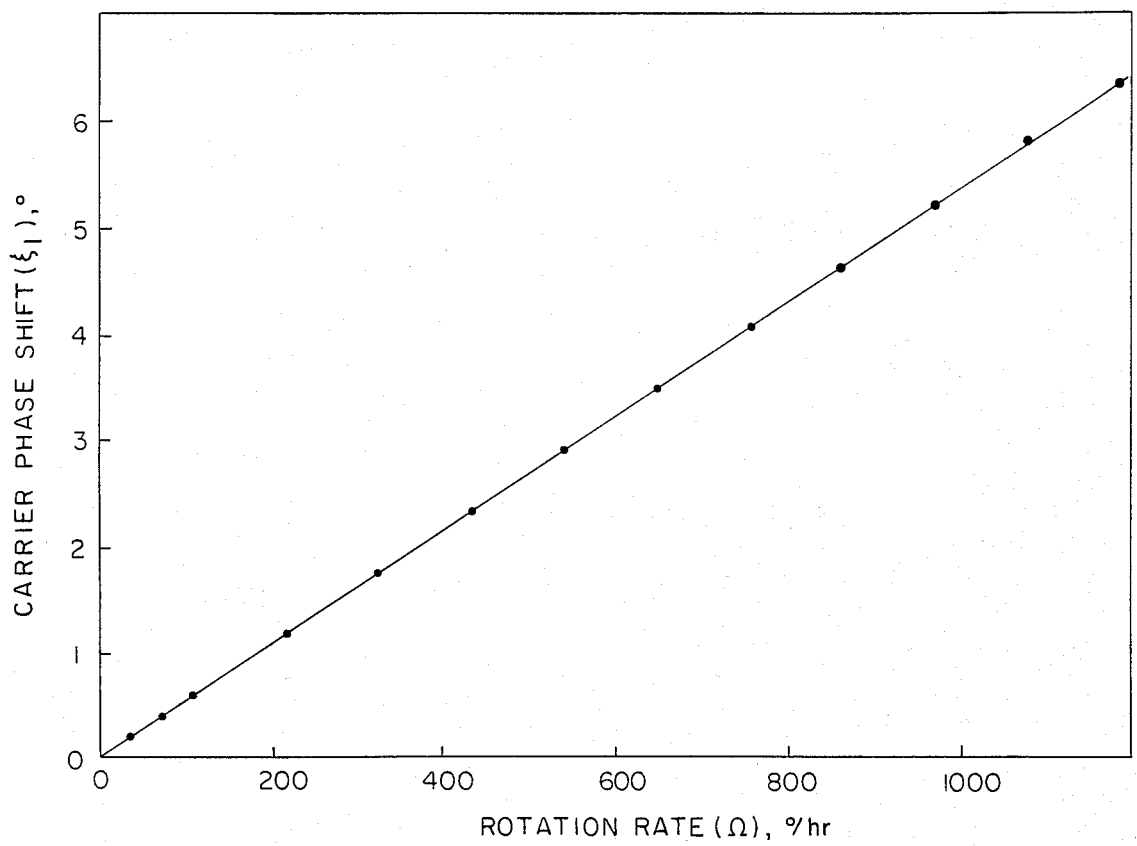
FIG. 9
(b)
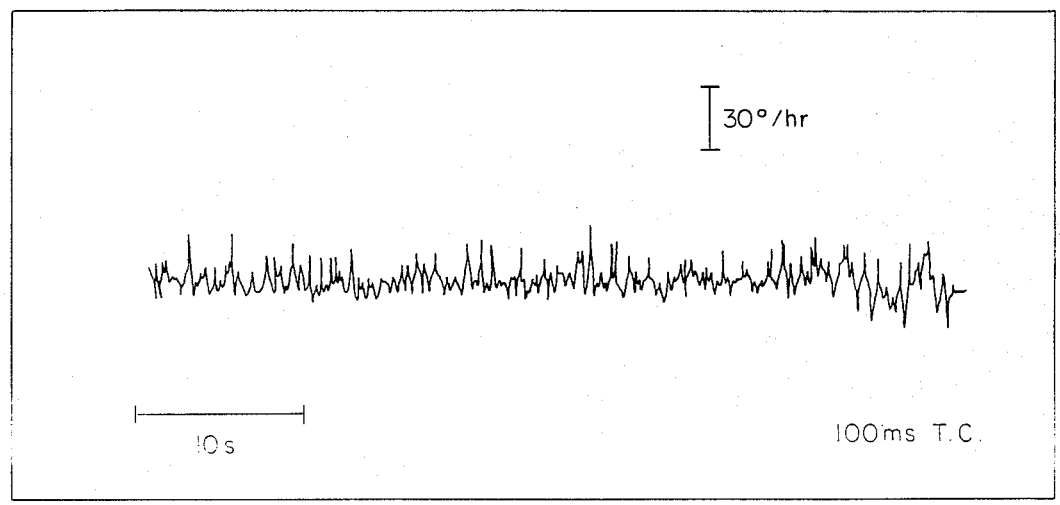

METHOD AND APPARATUS FOR INCREASING THE UNAMBIGUOUS SENSING RANGE IN AN INTERFEROMETRIC FIBER GYROSCOPE

BACKGROUND OF THE INVENTION

Fiber optic gyroscopes based on the "ring" interferometer configuration currently rely on the measurement of the Sagnac phase shift induced between clockwise (cw) and counterclockwise (ccw) propagating optical beams developed from a single light signal. The magnitude of the Sagnac phase shift is given by $$2\phi_S = \frac{8\pi NA}{\lambda c} \Omega$$

where A is the cross-sectional area of the fiber coil, N is the number of fiber turns, $\lambda$ is the wavelength of the light, and $\Omega$ is the rotation rate. Generally, high sensitivity measurements require the detection of phase shifts smaller than $10^{-6}$ radians. Due to the interferometer transfer function, however, the output becomes nonlinear at higher rotation rates, and if $2\phi_S$ exceeds $\pi/2$ radians the output becomes ambiguous.

Several schemes have been suggested as means for providing an extended dynamic range. Two such schemes are described in an article entitled "Two Wider Dynamic-Range Signal-Recovery Schemes for the FiberOptic Gyroscope," A. C. Lewin et al, *IEE Proceeding*, Vol. 132, No. 5, October 1985. Typically such schemes rely on the linearization of the interferometric transfer function over each $2\pi$ interval, use one carrier frequency, or adopt fringe counting electronics to track the total phase excursion. Although this mode of operation is desirable, the ambiguity associated with the periodic interferometer output is not completely eliminated. For instance, if the device is powered up in a rotating frame, the output is ambiguous by a factor $2m\pi$, where m represents any integer. This limitation is common to most types of demodulation schemes used with a gyroscope, but is not generally considered a serious disadvantage as the operational limits often mean the device is operated within the zero order fringe. Higher dynamic range systems which would be required to operate beyond the zero fringe would require that each fringe be counted and would therefore be limited by this effect.

The current methods make the development of sensors for D.C. measurables, i.e., temperature or pressure where fringe counting is normally required, impossible.

An additional problem of the methods is the inability to provide fringe numbers which are accurate enough to enable high resolution output for high sensitivity measurements to be provided.

SUMMARY OF THE INVENTION

It is therefore an object of the present invention to provide a method and apparatus for determining the operational fringe number in an interferometric fiber gyroscope whereby the unambiguous range of the device can be extended greater than 100 fold, thus eliminating the need for fringe counting, or tracking electronics.

A further object of the present invention is to provide a method that could prove useful in the development of sensors for D.C. measurables, i.e., temperature or pressure, where fringe counting is normally required.

An additional object of the present invention is to provide a method for determining fringe numbers which also enables a high resolution output to be provided for high sensitivity measurements.

These and other objects of the invention are achieved by providing a multiple light signal device for determining the operational fringe number of an interferometric optical fiber system comprising:

(a) means for providing first and second light signals having different wavelengths;

(b) means for combining the first and second signals into a combined input;

(c) means for introducing the combined input into an interferometric fiber system;

(d) means for detecting an output emanating from the interferometric system resulting from the introduction of the combined input into the system;

(e) means for dividing the output into a plurality of output signals, each representing a portion of the output attributable to one of the light signals, and (f) means for determining the interferometric phase lag between the output signals.

According to another aspect of the invention, the foregoing objects are achieved by providing a method for determining the operational fringe number of an interferometric optical fiber system comprising:

(a) providing first and second light signals having different wavelengths;

(b) combining said separate signals into a combined input;

(c) introducing said combined input into said interferometric optical fiber system;

(d) detecting an output emanating from said interferometric system resulting from the introduction of said combined input into said system;

(e) dividing said output into a plurality of output signals, each representing a portion of said output attributable to one of said first and second signals; and (f) determining the phase lag between said output signals.

According to further preferred aspects of the invention, the operational sensing range of the device and method may be extended by means providing a third light signal having a wavelength different from each of the first two light signals and by introducing this third signal into the interferometric fiber optical system, detecting a third output signal due to this third light signal, and determining the phase lag of the third output signal with respect to the other output signals.

According to still further preferred aspects of the invention, separate light pulses having different wavelengths may be individually introduced into the interferometric system.

The device and method of this invention permit the unambiguous rotation sensing range of the fiber gyroscope to be extended by a factor of greater than 100-fold. The technique provides an analog measure of the total phase excursion in the interferometer, thus eliminating the need for digital phase tracking or fringe counting. The technique also provides, in conjunction with the above, the ability to perform high resolution rotation sensing based on a previously proven method. The new method is flexible, in that the extended unambiguous range can be tailored to the desired application needs through control of the wavelength difference $(\lambda_1 - \lambda_2)$. Furthermore, the technique provides a means for measuring absolutely, with certain upper bounds determined by the exact wavelengths used, the rotation rate when the system is powered up in a rotating frame.

BRIEF DESCRIPTION OF THE DRAWINGS

The invention will be explained with reference to the accompanying drawings in which:

FIG. 5 shows the operation of the pseudoheterodyne technique for one channel ($\lambda_1$) (a): (i)—laser current modulation, (ii) photodetector output, (iii) mixer $M_1$ output (synchronously detected signal), (b): (i) as (iii) in (a), (ii) gate output, (iii) bandpass filter output;

FIG. 9 shows the (a) gyro output for a single wavelength ($\lambda_1$) in the range 0°–1000°/hour (b) the zerorotation rate short-term noise with 100 ms time constant.

DETAILED DESCRIPTION OF THE PREFERRED EMBODIMENTS

Figure 1:
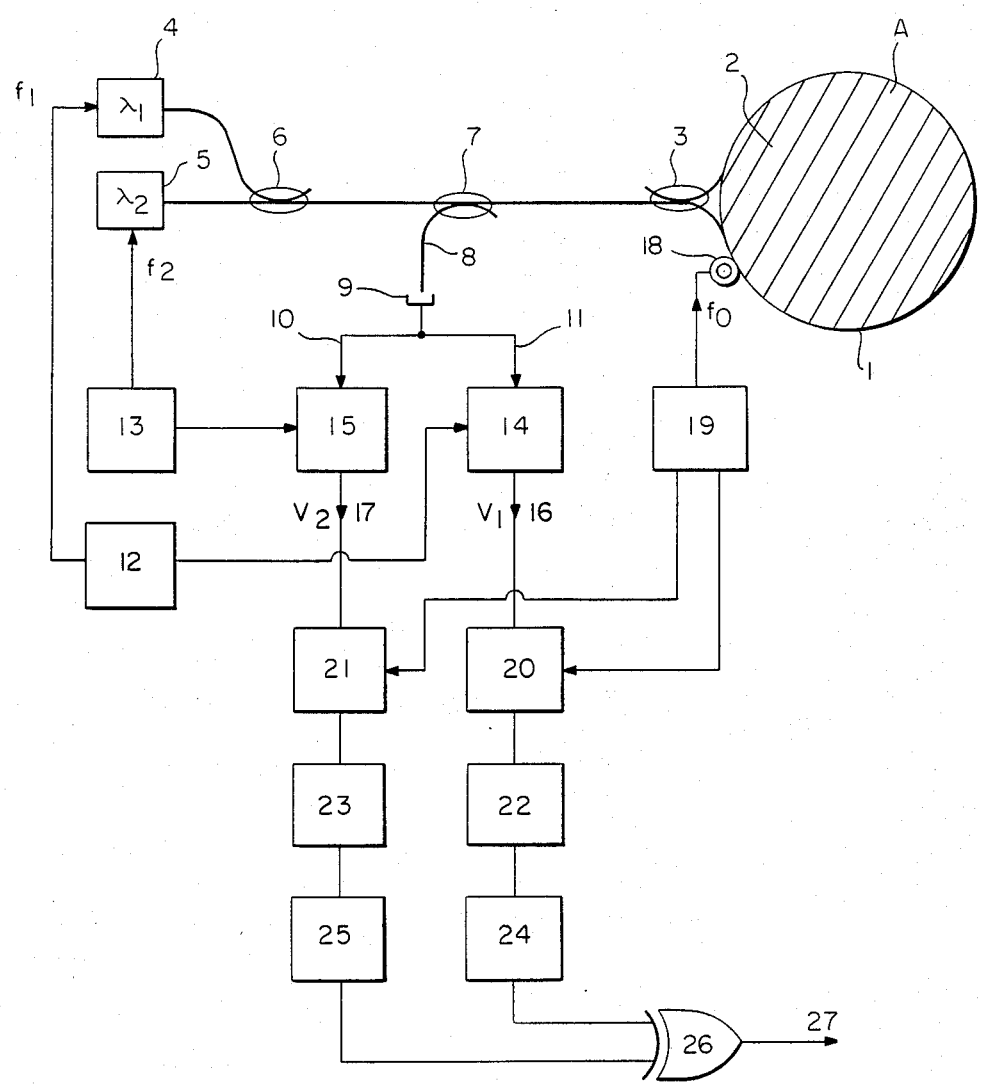
FIG. 1 shows a schematic diagram of the basic optical configuration of an embodiment of the apparatus of the invention.

A basic optical configuration for an interferometric fiber gyroscope is shown in FIG. 1. A length of fiber 1 wound on a former 2 of cross-sectional area A, and a bidirectional fiber coupler 3, form the optical fiber ring interferometer. The device is powered using two optical sources 4 and 5. Suitable optical sources include gas lasers, diode lasers or superluminescent diodes. Optical sources 4 and 5 operate at central wavelengths $\lambda_1$ and $\lambda_2$, respectively, such that $\lambda_1$ is greater than $\lambda_2$ and ($\lambda_1-\lambda_2$) is much less than $\lambda_1$ or $\lambda_2$. Two additional bidirectional fiber couplers 6 and 7 are used to combine the light at $\lambda_1$ and $\lambda_2$, and to monitor the output light from the reciprocal port 8 of the ring interferometer, respectively. The light at the fiber output is detected using a high-speed pin photodetector 9. The photo signal from photodetector 9 is divided into two channels 10 and 11. These channels are used to monitor the output intensity at each of the wavelengths, $\lambda_1$ and $\lambda_2$. In order to facilitate such monitoring, the intensity of the input light at $\lambda_1$ and $\lambda_2$ can be modulated at RF frequencies $f_1$ and $f_2$ using external modulators. Alternately, direct current modulation (for semiconductor sources) from two oscillators 12 and 13 may be used. The two photocurrents corresponding to $\lambda_1$ and $\lambda_2$ at the output of photodetector 9 are thus separated using either filters tuned to $f_1$ and $f_2$ or by synchronous detection (coherent mixing) using currently available electronic circuitry 14 and 15 like that found in locking amplifiers manufactured by such companies as EG&G, Ithaco and Stanford.

Figure 2:
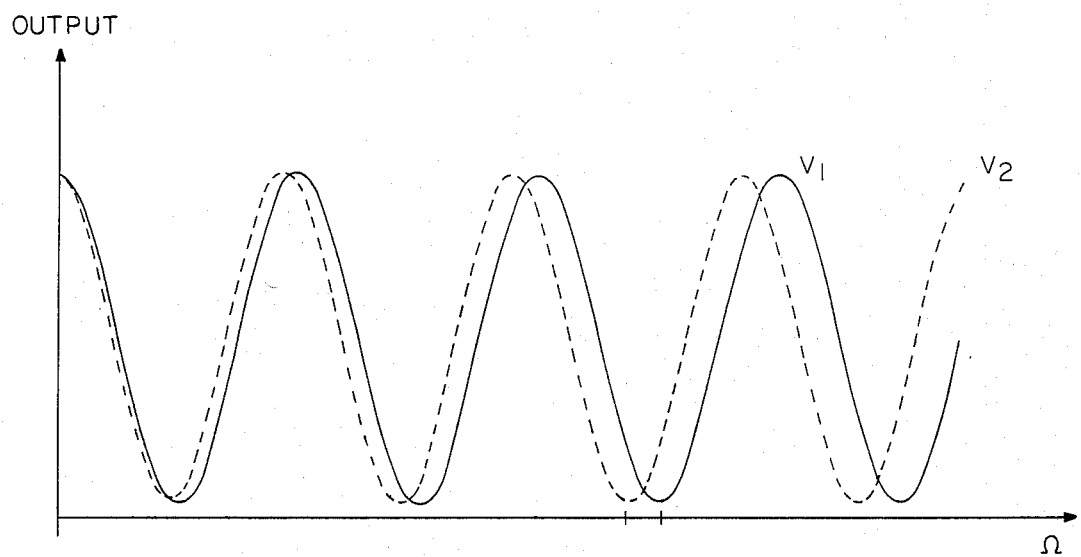
FIG. 2 is a graph showing the form of the dependence of voltages $V_1$ and $V_2$.

The voltages $V_1$ and $V_2$ obtainable at this stage 16 and 17 represent the output intensity of the gyroscope at each of the wavelengths $\lambda_1$ and $\lambda_2$, respectively. The form of the dependence of $V_1$ and $V_2$ with rotation rate is shown in FIG. 2. Both outputs follow the normal interferometric $(1+\cos\theta)$ transfer function, but they display different periods. This difference in period arises due to the difference in the wavelength of the two sources. The induced Sagnac shift is given by $$2\phi_{S1,2} = \frac{8\pi NA}{\lambda_{1,2}c}\Omega.$$

Thus, the phase shift imparted to the light at the longer wavelength $\lambda_1$ is for a certain rotation rate $\Omega$ less than that imparted to the shorter wavelength $\lambda_2$. Consequently, the output $V_1$ lags phase with $V_2$ by an amount $\Delta\phi$ which increases with increasing rotation rate $\Omega$. This phase difference has an unambiguous range $\pi$ which, if $\lambda_1-\lambda_2=4$ nm and $\lambda_1$ and $\lambda_2$ are both approximately 800 nm, corresponds to approximately 100 normal interferometer fringes. Determination of this phase lag allows the exact fringe number to be ascertained, and the unambiguous range of the output is thus increased.

To obtain a stable output from the gyroscope, this phase difference must be induced by the rotation rate $\Omega$ and not by environmental changes such as temperature or pressure. To achieve this stability, the optical paths traversed by the two light beams $\lambda_1$ and $\lambda_2$ must be perfectly reciprocal. If conventional circular-core monomode fiber is used, the reciprocal conditions will be violated due to environmental noise; however, it has been found in practice that the use of highly birefringent fiber is one way to remove this problem.

Figure 3:
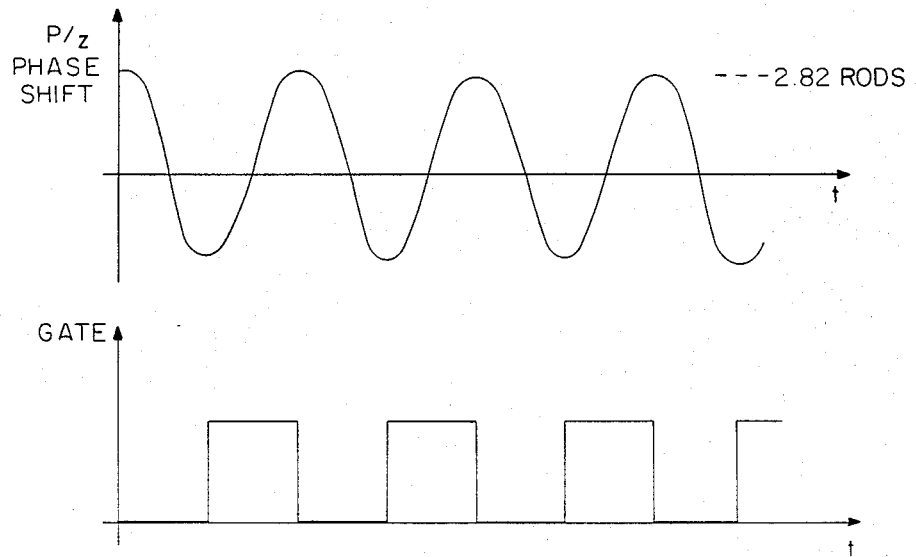
FIG. 3 shows a synchronization relationship between electric multiples or analog gates and the phase shift in the interferometer when the phase changes monotonically over each "on" interval of the gate.

The method chosen here to derive the phase lag $\Delta\phi$ represents only one of the possible implementations of this technique which could be conceived. Referring again to FIG. 1, a piezoelectric fiber stretcher 18 located near one end of the fiber gyro coil is driven with a sinusoidal waveform $V_o \cos\omega_o t$ derived from an oscillator 19. The frequency $f_o=\omega_o/2\pi$ is chosen such $f_o$ is much lower than $f_1$ or $f_2$. The voltage amplitude $V_o$ is adjusted such that the amplitude of the phase shift induced in the interferometer at $\omega_o$ is 2.82 radians. The electronically separated voltages $V_1$ and $V_2$ are then gated synchronously at $\omega_o$ using electronic multipliers or analog gates 20 and 21. The gated outputs are then passed through electronic bandpass filter networks 22 and 23 centered at a frequency of $2\omega_o$. If the synchronization relationship between the gate and the phase shift in the interferometer is such that the phase changes monotonically over each "on" interval of the gate (see FIG. 3), then the outputs of the filters will have the form of phase-modulated carriers given by $$S_1 = kV_1\cos(2\omega_o t + 2\phi_{S1})$$

$$S_2 = kV_2 \cos(2\omega_o t + 2\phi_{S2})$$

Either of these outputs can be utilized to perform high resolution rotation sensing by phase comparison with a $2\omega_o$ reference signal generated directly from the $\omega_o$ oscillator 19.

The phase difference $\Delta\phi = 2(\phi_{S2} - \phi_{S1})$, can be obtained by further electronic processing of the signals $S_1$ and $S_2$. The signals are first applied to a pair of voltage comparators 24 and 25 which convert the voltages into phase-modulated square wave carriers. These are then fed to a phase comparator 26 such as a logic EXOR gate. The mean output 27 of this comparator varies between zero volts ($\Delta\phi = 0$) and 2.5 V ($\Delta\phi = \pi$) (for nominally 5 volts TTL, CMOS logic) depending on the phase difference between the inputs, and thus provides a measure of the fringe number for $\lambda_1$ and $\lambda_2$. Alternatively, the carriers $S_1$ and $S_2$ can be fed directly to a phase meter to read $\Delta\phi (-\pi < \Delta\phi < \pi)$.

The method of the invention can also be implemented using more than two optical sources. This would result in the unambiguous rotation sensing range being extended even further than can be achieved using only two light sources. An embodiment which would use N number of light sources would also require N-2 number of additional oscillators 12, electronic circuitry 14, analog gates 20, filter networks 22 and comparators 24.

A further embodiment of the method of the invention would employ one or more pulsing light sources. Each pulse would have a different wavelength from all other pulses. These pulses would be introduced into an device, as described above, sequentially, with the output of comparators 24 or 25 for each separate pulse stored for use in a phase comparator 27, after all of the pulses have been run through the device.

If separate pulses of light are introduced sequentially into the interferometric system from pulsing light sources, then it is not necessary to RF modulate the sources. The resulting outputs will be generated in a time sequence determined by the time sequence of the pulsed light sources. The detector output can then be divided into separate channels by appropriate timing electronics. If desired, the light source pulse control and the detector timing control timing circuitry may be made variable.

Experimental

Figure 4:
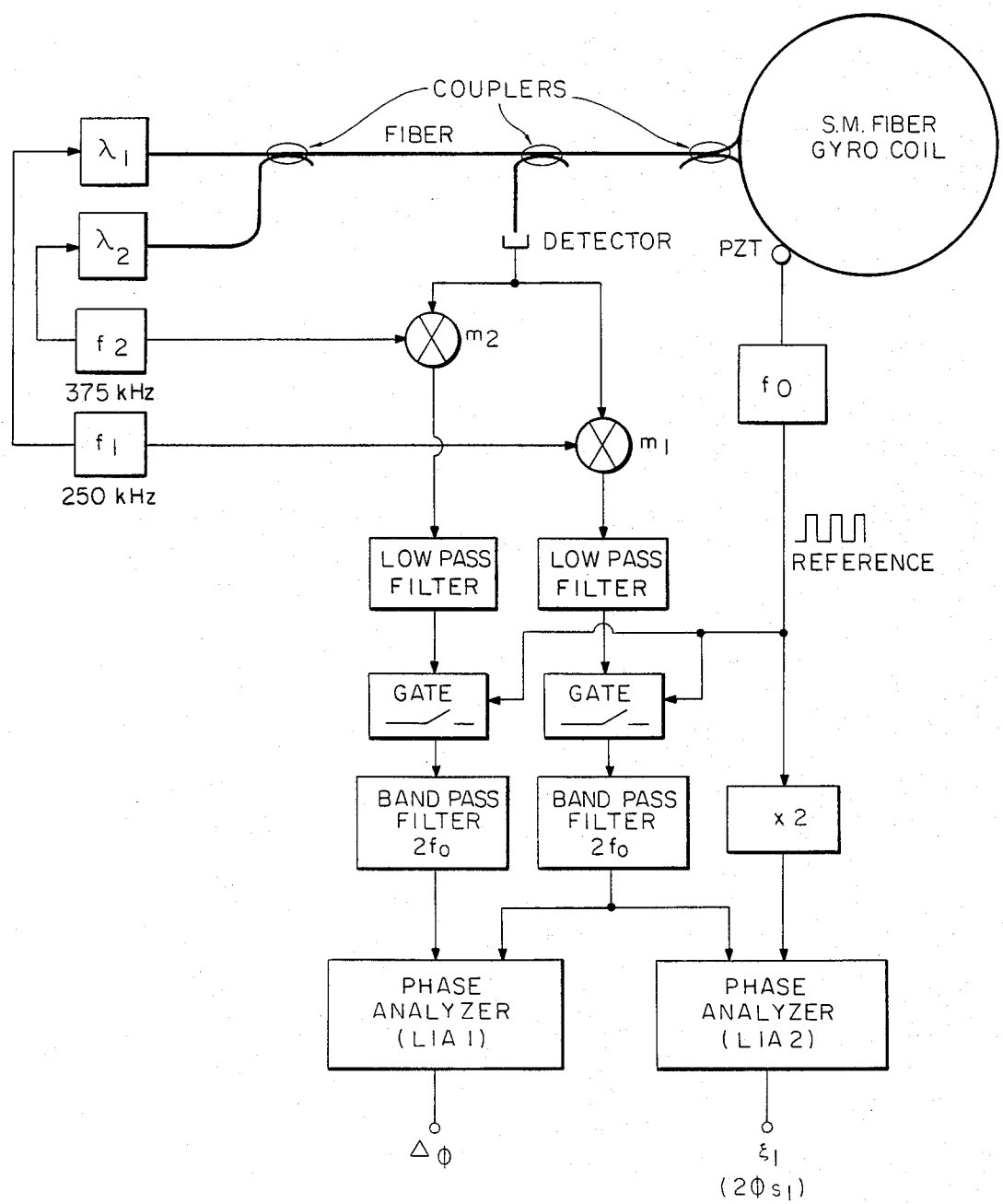
FIG. 4 shows a schematic diagram of a twowavelength fiber gyroscope, and the electronics used to implement the two-channel pseudo-heterodyne demodulation technique.

An experimental all-fiber system utilizing the first embodiment above is shown in FIG. 4. A gyroscope was formed using 2.3 kilometers of ITT single mode fiber coiled on a 32 centimeter diameter drum (N approximately equal to $2.3 \times 10^3$) and a fused directional coupler (Amphenol Interfuse). A piezoelectric cylinder located near one end of the fiber coil was used to introduce the sinusoidal phase modulation $\Psi_\epsilon$ (frequency $f_o$). Fiber couplers were used to combine the light from two pigtailed diode lasers operating at central wavelengths: $\lambda_1$ equal to 842 nanometers and $\lambda_2$ equal to 823 nanometers, and to monitor the output from the reciprocal port of the gyroscope. In order to facilitate wavelength demultiplexing at the gyro output, the diode lasers were intensity modulated using current modulation applied directly to the injection current of each device. Modulation frequencies of approximately 250 kilohertz and approximately 375 kilohertz were chosen for $f_1$ and $f_2$, respectively: the separation of these frequencies provided sufficient bandwidth for the interferometer phase sidebands when $f_o$ (equal to $\omega_o/2\pi$) was set below 10 kilohertz. Synchronous detection of the components in the photocurrent corresponding to $\lambda_1$ and $\lambda_2$ was achieved by mixing the detector output with reference signals at $f_1$ and $f_2$ in two separate analogue mixers. (1 megahertz bandwidth). These wavelength-demultiplexed outputs were then fed to separate synthetic heterodyning channels—each comprising a gate and bandpass filter set at $2\omega_o$. The heterodyne carrier signals obtained were then fed, along with a reference $2\omega_o$ signal (directly from the $\omega_o$ oscillator), to two phase analyzers configured, as shown in FIG. 4, to provide outputs related to the phase shift $2\phi_{S1}$ and the differential Sagnac shift $\Delta\phi (= 2\phi_{S2} - 2\phi_{S1})$.

Results

FIG. 5 demonstrates the operation of the synthetic heterodyne detection scheme for one channel ($\lambda_1$). The upper trace in (a) shows the modulation applied to the laser ($f_1$ equal to 250 kilohertz), which was biased slightly above threshold (approximately 45 miliamps). Trace (ii) shows the raw photodetector output signal with the piezoelectric cylinder driven at 4.5 kilohertz and at an amplitude sufficient to induce a approximately 2.8 radians peak phase modulation in the interferometer. Trace (iii) in FIG. 5a shows the output from mixer $M_1$ (FIG. 4). This output is also shown in FIG. 5b as trace (i) along with the gate (trace ii) and bandpass filter (lower trace) outputs. This final output is the synthesized heterodyne carrier signal for $\lambda_1$.

Figure 6:
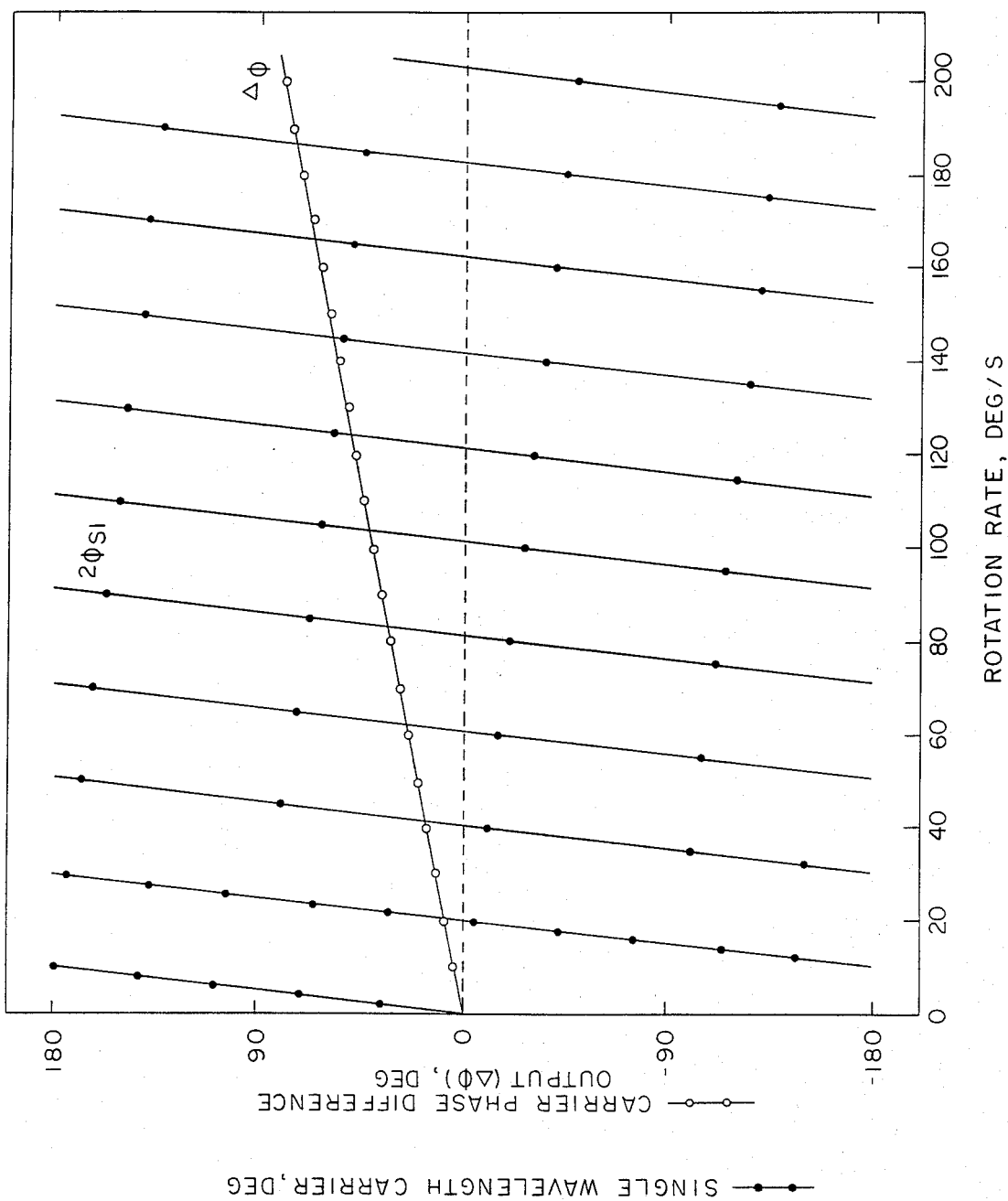
FIG. 6 shows solid points showing the actual phase analyzer output, $\delta_1$ corresponding to the singlewavelength channel ($\lambda_1$). Open circles show the $\lambda_1,\lambda_2$ carrier phase difference $\Delta\phi$, measured over the same range in rotation rate.
Figure 7:
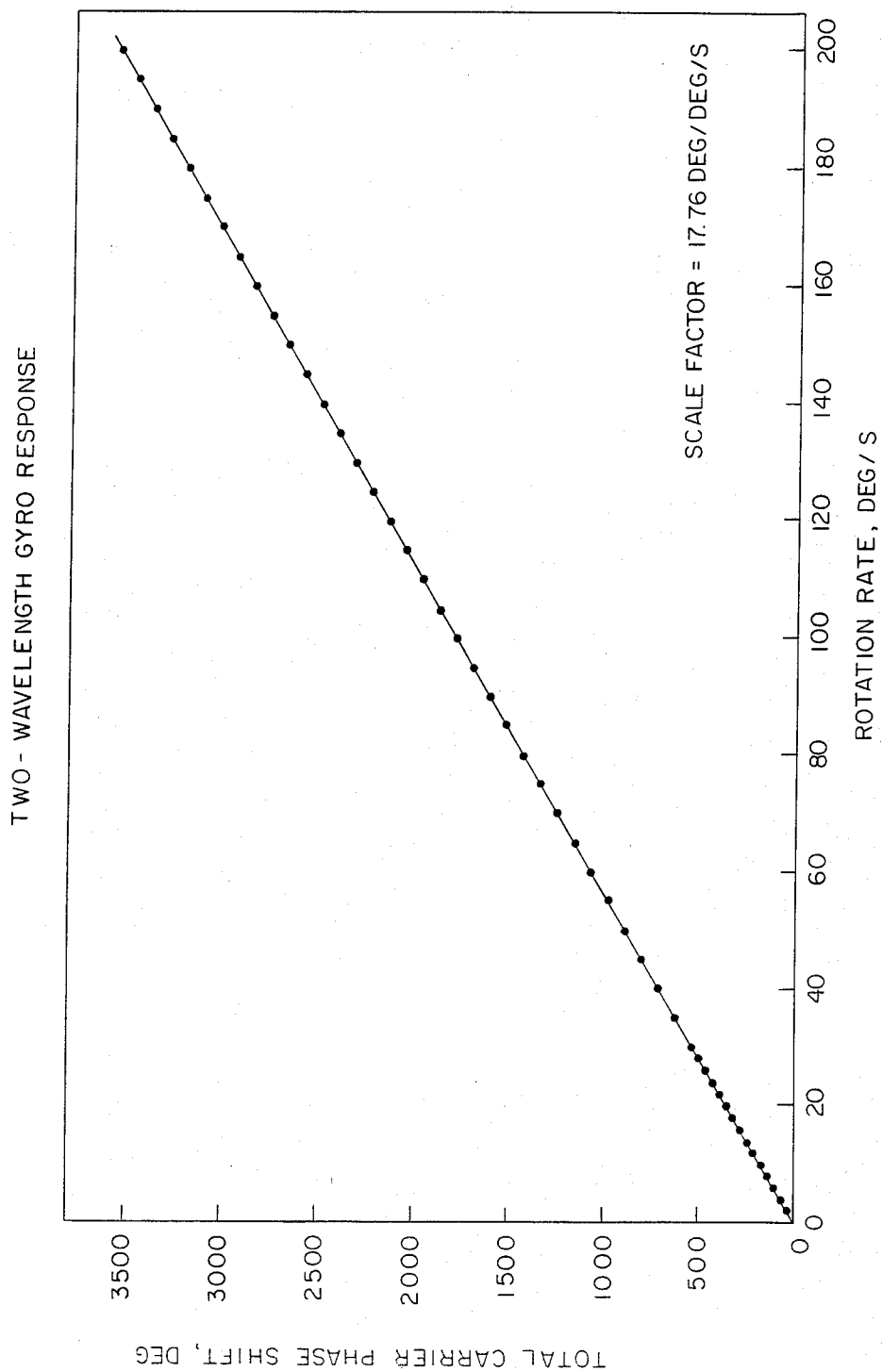
FIG. 7 shows the carrier phase shift, $\delta_1$, as a function of $\Omega(\lambda_1$ only) calculated using both outputs shown in FIG. 5 (note full unambiguous range is 450 degrees/-second)

The carrier phase shift $\xi_1$ measured as a function of rotation rate $\Omega$, is shown in FIG. 6. Here the actual phase analyzer readings (f.s. plus or minus 180 degrees) are plotted even through the results extend over multiple $2\pi$ (360 degrees) phase excursions in $\xi_1$. Presenting the data in this form highlights the intrinsic ambiguity associated with the output, and shows that on initialization the sensor output is strictly ambiguous by a factor of approximately $2\pi$ in $\xi_1$. Also shown in FIG. 6, however, is the carrier phase difference, $\Delta\phi$, measured over the same range using the phase analyzer, LIA-1. Clearly, this output increases linearly with $\Omega$, showing a scale factor of 0.395 degrees/degrees/second, which is, as expected from Eq. (2), much lower than the 17.76 degrees/degrees/second obtained for the single-wavelength ($\lambda_1$) output. From this scale factor measurement, the unambiguous range in $\Delta\phi$ (plus or minus 180 degrees) can be determined at plus or minus 450 degrees/second, or plus or minus 45 complete fringe shifts in the $\lambda_1$ output (i.e., 46 fringes in $\lambda_2$). The $\Delta\phi$ output can thus be used to determine the fringe order for the $\lambda_1$ output over this rotation range. FIG. 7 shows the same data as in FIG. 6, but with the phase shift $\xi_1$ plotted taking into account the multiple fringe excursions. This result clearly demonstrates the linearity and wide dynamic range capability of the pseudo-heterodyne demodulation technique.

Figure 8:
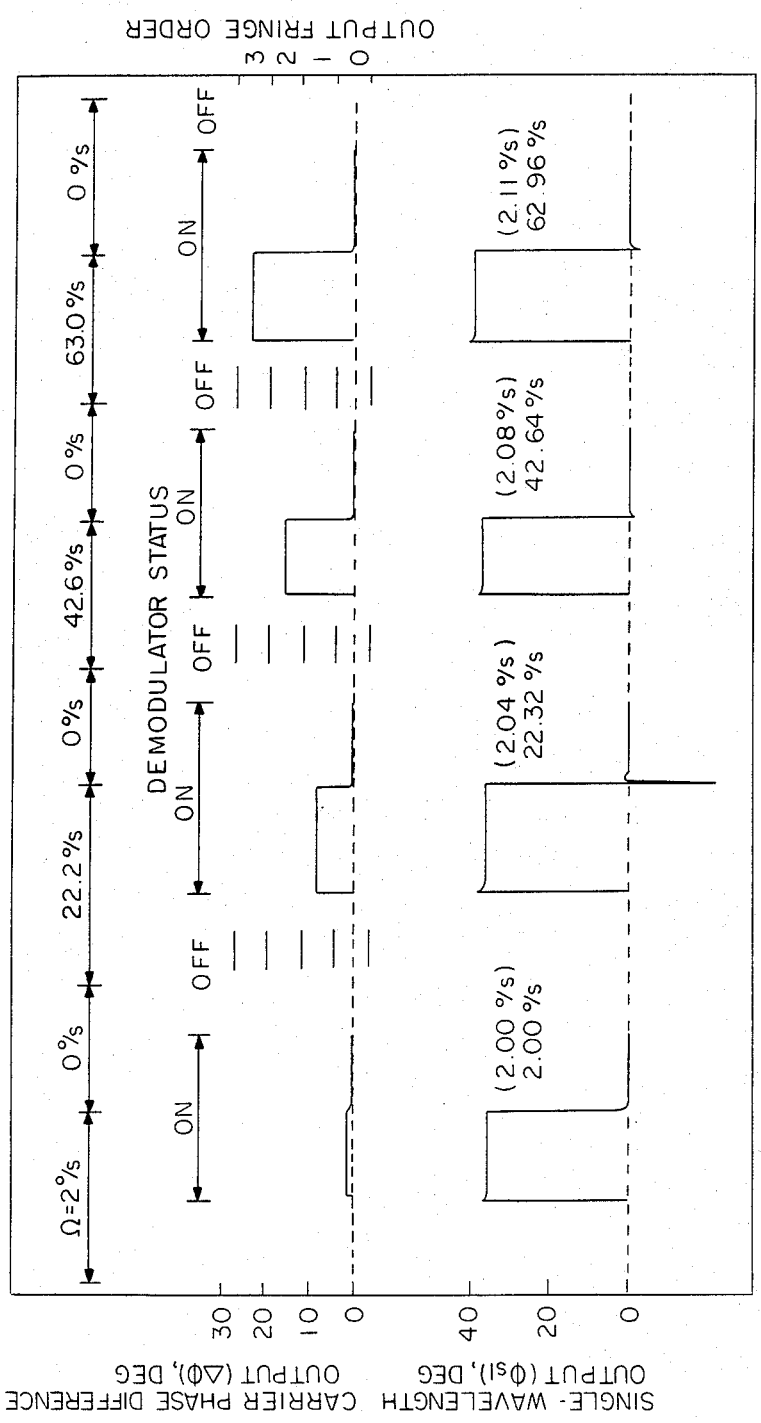
FIG. 8 shows the gyro outputs obtained when system is initialized in a rotating frame. Upper trace —$\Delta\phi$ output; lower trace -single ($\lambda_1$) wavelength output ($\xi_1$). Outputs a, b, c and d correspond to those generated at rates of 2.0 degrees/second, 22.3 degrees/second, 42.6 degrees/second and 63.0 degrees/second, respectively.
Figure 10:
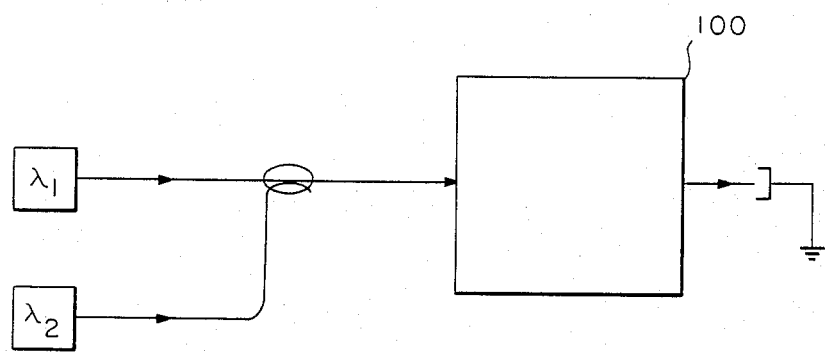
FIG. 10 shows an embodiment using a Mach-Zehnder interferometer.
Figure 11:
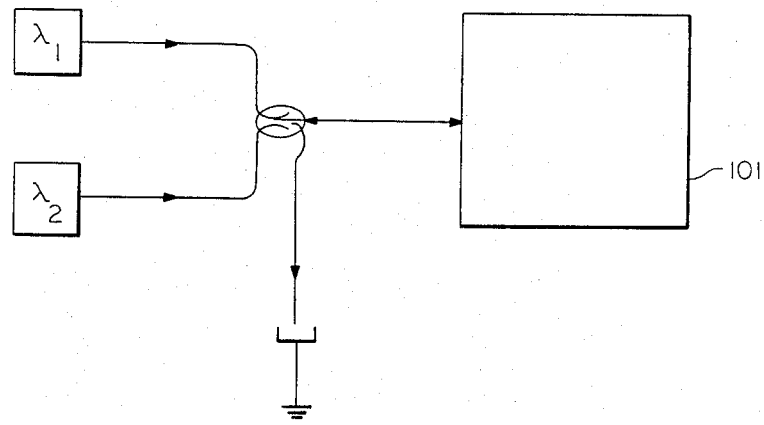
FIG. 11 shows an embodiment using a Michelson interferometer.

The usefulness of this two-wavelength approach in addressing the dynamic range problem of the fiber gyroscope is demonstrated by the results shown in FIG. 8. Here, the two phase analyzer outputs ($\xi_1, \Delta\phi$) were monitored simultaneously while the system was effectively initialized in a rotating frame. Initialization was simulated by disconnection/reconnection of the common ($\lambda_1$) carrier input to both phase analyzers. With this input disconnected, the LIA outputs were noisy and are not shown in the Figure for clarity. Then, with the gyroscope coil rotating at a known rate, the inputs were reconnected and the outputs recorded. During the recording the rotation rate was reset to provide a "zero-rate" baseline. This procedure was repeated four times for rotation rates of 2 degrees/second, 22.3 degrees/second, 42.6 degrees/second and 63 degrees/second; these rates being chosen because with a $\lambda_1$ output scale factor of 17.76 degrees/degrees/second they produced comparable outputs from the phase analyzer monitoring $\xi_1$ and clearly demonstrated the ambiguity problem present with the single-wavelength output. Based on this output alone the measured rates are 2.00 degrees/second, 2.04 degrees/second, 2.08 degrees/second and 2.11 degrees/second; however, using the upper trace in FIG. 9, which shows the $\Delta\phi$ output, the fringe number can be ascertained, and on combining the output information from both traces, rotation rates of 2.00 degrees/second, 22.32 degrees/second, 42.64 degrees/second and 62.96 degrees/second are obtained, which are with 0.1% of the actual rates applied.

Although the preceding results demonstrate the multiple fringe sensing capability of the two-wavelength pseudo-heterodyne demodulation approach described here, wide dynamic range operation also requires sensitive low rotation-rate performance. FIG. 9a shows the gyroscope output ($\lambda_1$) over the range 0–1000 degrees/hour, and FIG. 9b shows a typical zero-rotation noise level recorded with a 100 milliseconds time constant. The rms level of the short-term noise corresponds to approximately 8 degree/hour, which could be reduced to approximately 1 degree/hour by increasing the time-constant to 10 s. This noise level corresponds to an interferometer phase noise approximately $5.10^{-4}$ radians/Hertz$^{\frac{1}{2}}$, which is at least approximately 100 greater than that obtained routinely in prior optimized gyroscope systems.

As the system described here was not optimized for low rotation rates, the most probable cause of the relatively high short-term noise and drift levels observed can be attributed to the following factors; (a) backscatter due to the moderate coherence properties of the laser used, (b) no input polarizer was used, (c) the piezoelectric phase shifter was driven at a frequency well below the proper-modulation frequency [13] for the fiber coil, and (d) excess noise in the gating and filtering circuitry.

The method of the invention here can be applied to any type of path-balanced interferometric system, i.e., Mach-Zehnder 100, Michelson 101, polarimetric, etc. In each case, the use of the method allows the unambiguous range of the sensor to be extended beyond the normal plus or minus $\pi/2$ radians phase shift. The method and apparatus of the invention may be particularly useful in the development of sensors for D.C. measurables such as temperature on pressure where fringe counting is normally required.

An additional description of the principles behind the present invention can be found in the following papers and articles, co-authored by the present inventor, which are hereby incorporated herein by reference: "Two-Wavelength, Wide-Dynamic Range Fiber Gyroscope", A. D. Kersey et al, Presented at the SPIE Conference on the 100th Anniversary of the Fiber Gyroscope, Cambridge, Mass., Sept. 25, 1986; and "Two-Wavelength Fibre Gyroscope with Wide Dynamic Range", A. D. Kersey et al, *Electronics Letters*, Vol. 22, No. 18, pp. 935–937, Aug. 28, 1986.

The foregoing specific description has been set forth merely to illustrate preferred embodiments of the invention and is not intended to be limiting. Since modifications of the described embodiments incorporating the spirit and substance of the invention may occur to persons skilled in the art, the scope of the invention should be determined with reference to the following claims and equivalents.

What is claimed is:

1. A device for determining the operational fringe number of an interferometric optical fiber system comprising:
   (a) means for providing first and second light signals having different wavelengths;
   (b) means for combining said first and second signals into a combined input;
   (c) means for introducing said combined input into an interferometric fiber system;
   (d) means for detecting an output emanating from said interferometric system resulting from the introduction of said combined input into said system;
   (e) means for dividing said output into a plurality of output signals, each representing a portion of said output attributable to one of said light signals; and
   (f) means for determining the phase lag between said output signals, said phase lag being used to determine said operational fringe number.

2. A device as claimed in claim 1, wherein said phase lag determining means comprises separate heterodyne demodulation means for each output signal and means for comparing the electronic phase of each of said output signals to a reference signal.

3. A device as claimed in claim 1 wherein said detecting means comprises a pin photodetector.

4. A device as claimed in claim 1, wherein said interferometric system is an optical fiber gyroscope.

5. A device as claimed in claim 2, wherein said heterodyne demodulation means comprises a synthetic heterodyne demodulator.

6. A device as claimed in claim 4, wherein a reference signal from said gyroscope is employed to help determine the phase lag between said output signals.

7. A device as claimed in claim 2, wherein said light signals are modulated at separate RF frequencies and said output dividing means comprises electronic filters tuned to said frequencies.

8. A device as claimed in claim 7, wherein said tuned filters are variable.

9. A device as claimed in claim 2, wherein said light signals are modulated at separate RF frequencies and said output dividing means comprises a synchronous detector.

10. A device as claimed in claim 2, wherein said light signal providing means comprises a plurality of separate light sources.

11. A device as claimed in claim 1, wherein a third light signal having a separate wavelength is also provided, and said third signal is combined with said first and second signals into said combined input.

12. A device for determining the operational fringe number of an interferometric fiber optical system comprising:
   (a) means for providing first and second light signals having different wavelengths in separate pulses;
   (b) means for introducing each of said pulses individually into an interferometric system fiber;
   (c) means for detecting a separate output signal for each pulse emanating from said interferometric system resulting from the introduction of each of said pulses into said system; and (d) means for determining the phase lag between each of said separate output signals, said phase lag being used to determine said operational fringe number.

13. A device as claimed in claim 12, wherein said phase lag determining means comprises separate heterodyne demodulation means for each output signal and means for comparing the electronic phase of each of said output signals to a reference signal.

14. A device as claimed in claim 12 wherein said detecting means comprises a pin photodetector.

15. A device as claimed in claim 12, wherein said interferometric system is an optical fiber gyroscope.

16. A device as claimed in claim 13, wherein said heterodyne demodulation means comprises a plurality of synthetic heterodyne demodulators.

17. A device as claimed in claim 15, wherein a reference signal from said gyroscope is employed to help determine the phase lag between said output signals.

18. A device as claimed in claim 14, wherein said output dividing means comprises timing means for dividing the detecting means output into separate channels.

19. A device as claimed in claim 12, wherein said light signal providing means comprises a plurality of separate light sources.

20. A device as claimed in claim 12, further comprising means for providing a third light pulse signal having a different wavelength, and wherein said third light pulse signal is introduced into said interferometric system by said introducing means, an output signal for said third pulse is detected by said detecting means, and the phase lag between said third pulse output signal and the output signals for the first and second pulses is determined by said phase lag determining means.

21. A method for determining the operational fringe number of an interferometric optical fiber system comprising:
  (a) providing first and second light signals having different wavelengths;
  (b) combining said separate signals into a combined input;
  (c) introducing said combined input into said interferometric optical fiber system;
  (d) detecting an output emanating from said interferometric system resulting from the introduction of said combined input into said system;
  (e) dividing said output into a plurality of output signals, each representing a portion of said output attributable to one of said first and second signals; and
  (f) determining the phase lag between said output signals, and from the phase lag, determining the operational fringe number.

22. A method as claimed in claim 21, wherein said first and second light signals are provided by separate light sources.

23. A method as claimed in claim 21, wherein said interferometric optical fiber system is a fiber optical gyroscope.

24. A method for determining the operational fringe number of an interferometric fiber optic system comprising:
  (a) providing first and second pulses of light having different wavelengths;
  (b) introducing each of said separate pulses individually into said interferometric fiber system;
  (c) detecting a separate output signal for each pulse emanating from said interferometric system resulting from the introduction of each of said pulses into said system using a detection means; and
  (d) determining the phase lag between each of said separate output signals using heterodyne type signal processing, and from the phase lag, determining the operational fringe number.

25. A method as claimed in claim 24, wherein a third light signal pulse having a different wavelength is provided and introduced individually into said interferometric fiber system, a separate output signal for said third pulse emanating from said interferometric system is detected, and the phase lag between said third pulse output signal and the output signals resulting from said first and second pulses is determined.

26. A device as recited in claim 1 wherein said interferometric system is a path balanced optical fiber interferometric system.

27. A device as recited in claim 1, wherein said interferometric system is an optical fiber Mach-Zehnder interferometer.

28. A device as recited in claim 1, wherein said interferometric system is an optical fiber Michaelson interferometrer.

* * * * *